US012674772B2

(12) United States Patent
Kanbe et al.

(10) Patent No.: US 12,674,772 B2
(45) Date of Patent: Jul. 7, 2026

(54) THERMAL DISPLACEMENT ESTIMATING METHOD FOR MACHINE TOOL AND MACHINE TOOL

(71) Applicant: OKUMA CORPORATION, Niwa-Gun (JP)

(72) Inventors: Reiji Kanbe, Niwa-Gun (JP); Misaki Hida, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 273 days.

(21) Appl. No.: 18/412,662

(22) Filed: Jan. 15, 2024

(65) Prior Publication Data

US 2024/0248053 A1     Jul. 25, 2024

(30) Foreign Application Priority Data

Jan. 20, 2023     (JP) ................................. 2023-007527

(51) Int. Cl.
*G01N 25/16*          (2006.01)
(52) U.S. Cl.
CPC .................................... *G01N 25/16* (2013.01)
(58) Field of Classification Search
None
See application file for complete search history.

(56) References Cited

U.S. PATENT DOCUMENTS

| | | | |
|---|---|---|---|
| 5,833,407 | A | 11/1998 | Senda |
| 10,766,112 | B2 | 9/2020 | Nakamura |
| 2016/0121445 | A1 | 5/2016 | Sogabe et al. |
| 2017/0017227 | A1 | 1/2017 | Qi |

(Continued)

FOREIGN PATENT DOCUMENTS

| | | |
|---|---|---|
| CN | 106346304 A | 1/2017 |
| CN | 114850965 A | 8/2022 |

(Continued)

OTHER PUBLICATIONS

Taiwanese First Office Action (Application No. 113102215) dated Jan. 29, 2026 (with English translation) (21 pages).

*Primary Examiner* — Erica S Lin

(74) *Attorney, Agent, or Firm* — Muncy, Geissler, Olds & Lowe, P.C.

(57)          ABSTRACT

A thermal displacement estimating method includes: detecting each temperature of a predetermined heat generating portion and a predetermined main body structure portion by a temperature measurement device; and estimating a thermal displacement of the heat generating portion by an estimation model based on a detected temperature. The estimating of the thermal displacement includes: obtaining a conversion coefficient equivalent temperature change amount equivalent to a change amount of a conversion coefficient before and after a cooling capacity change from a relationship between a predetermined cooling heat amount of a cooling device and the conversion coefficient between the temperature and the displacement for estimating the thermal displacement from the detected temperature and/or a cooling heat amount equivalent temperature change amount equivalent to a changed heat amount before and after the cooling capacity change from a relationship between the predetermined cooling heat amount and a temperature equivalent to the cooling heat amount.

7 Claims, 2 Drawing Sheets

(56) References Cited

U.S. PATENT DOCUMENTS

| | | | |
|---|---|---|---|
| 2017/0023417 A1* | 1/2017 | Koyama | .............. G05B 19/404 |
| 2020/0230764 A1 | 7/2020 | Mizoguchi | |
| 2021/0197303 A1 | 7/2021 | Takemoto et al. | |
| 2022/0226953 A1 | 7/2022 | Mizoguchi | |

FOREIGN PATENT DOCUMENTS

| | | | |
|---|---|---|---|
| EP | 2 537 631 A1 | 12/2012 | |
| JP | H09-225781 A | 9/1997 | |
| JP | 6349276 B2 | 6/2018 | |
| JP | 6445395 B2 | 12/2018 | |
| TW | 202138089 A | 10/2021 | |

* cited by examiner

THERMAL DISPLACEMENT ESTIMATING METHOD FOR MACHINE TOOL AND MACHINE TOOL

CROSS REFERENCE TO RELATED APPLICATION

This application claims the benefit of Japanese Patent Application Number 2023-007527 filed on Jan. 20, 2023, the entirety of which is incorporated by reference.

FIELD OF THE INVENTION

The disclosure relates to a method for estimating a thermal displacement of a machine tool based on a temperature and the machine tool capable of performing the method.

BACKGROUND OF THE INVENTION

In machining with a machine tool, such as a machining center, a thermal displacement in an axial direction is generated due to frictional heat generation in a bearing and heat generation in a motor during rotation of a main spindle, and machining accuracy is deteriorated. As a suppression countermeasure therefor, in terms of a machine structure, there is a method of removing heat (hereinafter referred to as "main spindle cooling") by disposing a cooling circuit in a main spindle housing portion and flowing a cooling oil. In terms of electrical control, there is a method of estimating a main spindle thermal displacement from machine body temperature information to compensate it.

In the former main spindle cooling, power consumption of a main spindle cooling device for controlling the temperature of the supplied cooling oil to the machine body temperature occupies a high proportion among the peripheral devices. Accordingly, countermeasures for reducing the power consumption by operation control of the main spindle cooling device are widely performed. For example, in the disclosure of JP 6445395 B, a main spindle cooling device is stopped when a temperature in a proximity of a main spindle, which is calculated using a main spindle temperature rise value based on a machine body temperature when a machine is at rest, satisfies an arbitrary threshold value. According to the disclosure, it is possible to reduce the power consumption in a situation where the machining accuracy is not deteriorated. In the disclosure of JP 6349276 B, the power consumption is reduced by halting a main spindle cooling device in situations where an influence on the machining accuracy is small, such as when a rotation speed and a heat generation source temperature satisfy the predetermined threshold values or less.

In the latter thermal displacement estimating method, JP H9-225781 A by the applicant of the application has proposed a calculation method in which the main spindle thermal displacement is estimated by changing a calculation coefficient of a thermal displacement estimation calculation formula according to a rotation speed and a time or a compensation count.

It is desirable to reduce power consumption not only by stopping a main spindle cooling device when a machine is at rest as disclosed in the disclosure of JP 6445395 B but also by stopping the main spindle cooling device when the machine is in operation as disclosed in the disclosure of JP 6349276 B. However, in a main spindle of a machining center or the like, since a main spindle thermal displacement amount increases over time even when a rotation speed is around 1000 $min^{-1}$ in the case where the cooling device is stopped while the main spindle is rotating, a period in which an influence on accuracy is small is limited to a short time. In view of this, in order to maintain the accuracy for a longer period of time, it is required to estimate and compensate the main spindle thermal displacement as disclosed in the disclosure of JP H9-225781 A. However, since a thermal displacement property differs between when the main spindle cooling device is in operation and when it is stopped, it is not possible to accurately estimate the thermal displacement by the method as disclosed in JP H9-225781 A.

Therefore, it is an object of the disclosure to provide a thermal displacement estimating method of a machine tool and a machine tool that can accurately estimate a thermal displacement even in a transient state where an operation state of a cooling device is changed, and reduce power consumption without deteriorating machining accuracy.

SUMMARY OF THE INVENTION

In order to achieve the above-described object, there is provided a first configuration of the disclosure. A thermal displacement estimating method for a machine tool including a cooling device and a temperature measurement device. The thermal displacement estimating method includes: detecting each temperature of a predetermined heat generating portion and a predetermined main body structure portion by the temperature measurement device; and estimating a thermal displacement of the heat generating portion by an estimation model based on a detected temperature. The estimating of the thermal displacement includes: determining a coefficient related to a time response for estimating the thermal displacement from the detected temperature in accordance with a cooling capacity change due to operation control of the cooling device when the machine is in operation; obtaining at least one of a conversion coefficient equivalent temperature change amount equivalent to a change amount of a conversion coefficient before and after the cooling capacity change from a relationship between a predetermined cooling heat amount of the cooling device and the conversion coefficient between the temperature and the displacement for estimating the thermal displacement from the detected temperature and a cooling heat amount equivalent temperature change amount equivalent to a changed heat amount before and after the cooling capacity change from a relationship between the predetermined cooling heat amount and a temperature equivalent to the cooling heat amount; and estimating the thermal displacement of the heat generating portion based on the coefficient and a temperature obtained by adding at least one of the conversion coefficient equivalent temperature change amount and the cooling heat amount equivalent temperature change amount to the detected temperature.

In another aspect of the first configuration of the disclosure, which is in the above configuration, the cooling capacity change of the cooling device is any one of or both of operating and stopping of the cooling device and increasing and decreasing of the cooling oil amount used for cooling.

In another aspect of the first configuration of the disclosure, which is in the above configuration, the heat generating portion is a rotation shaft, and the conversion coefficient equivalent temperature change amount is calculated based on a rotation speed of the rotation shaft and a time after the cooling capacity change of the cooling device.

In another aspect of the first configuration of the disclosure, which is in the above configuration, the cooling heat amount equivalent temperature change amount is calculated based on a temperature time constant before the cooling capacity change, a temperature time constant after the cooling capacity change, and a time after the cooling capacity change.

In another aspect of the first configuration of the disclosure, which is in the above configuration, a condition of the cooling capacity change of the cooling device has a predetermined upper limit value and a predetermined lower limit value as threshold values, the cooling capacity is decreased when a temperature rise value of the detected temperature becomes equal to or less than the lower limit value, and the cooling capacity is increased when the temperature rise value of the detected temperature becomes equal to or more than the upper limit value.

In another aspect of the first configuration of the disclosure, which is in the above configuration, the heat generating portion is a rotation shaft, and a temperature rise value of a bearing portion of the rotation shaft or a proximity of the bearing portion based on a temperature of the main body structure portion is used for thermal displacement estimation.

In order to achieve the above-described object, there is provided a second configuration of the disclosure. A machine tool includes a cooling device, a temperature measurement device; a temperature detection unit that detects each temperature of a predetermined heat generating portion and a predetermined main body structure portion by the temperature measurement device; and a thermal displacement estimating unit that estimates a thermal displacement of the heat generating portion by an estimation model based on a detected temperature. The thermal displacement estimating unit is configured to: determine a coefficient related to a time response for estimating the thermal displacement from the detected temperature in accordance with a cooling capacity change due to operation control of the cooling device when the machine is in operation; obtain at least one of a conversion coefficient equivalent temperature change amount equivalent to a change amount of a conversion coefficient before and after the cooling capacity change from a relationship between a predetermined cooling heat amount of the cooling device and the conversion coefficient between the temperature and the displacement for estimating the thermal displacement from the detected temperature and a cooling heat amount equivalent temperature change amount equivalent to a changed heat amount before and after the cooling capacity change from a relationship between the predetermined cooling heat amount and a temperature equivalent to the cooling heat amount; and estimate the thermal displacement of the heat generating portion based on the coefficient and a temperature obtained by adding at least one of the conversion coefficient equivalent temperature change amount and the cooling heat amount equivalent temperature change amount to the detected temperature.

The "estimation model" in the disclosure refers to a series of processes preliminarily patterned to estimate the thermal displacement. For example, examples of the estimation model include those constituted of one or a plurality of mathematical Formulae including coefficients and determination processing.

According to the disclosure, at least one of the conversion coefficient equivalent temperature change amount and the cooling heat amount equivalent temperature change amount is included to the detected temperature of the heat generating portion or the proximity of the heat generating portion. The conversion coefficient equivalent temperature change amount corresponds to the difference in the predetermined conversion coefficient between the temperature and the displacement before and after the operation control change of the cooling device. The cooling heat amount equivalent temperature change amount corresponds to the difference in the cooling heat amount. Thus, it becomes possible to deal with deterioration of the thermal displacement estimation accuracy caused in the cooling transient state while the operation control of the cooling device is performed when the machine is in operation. Accordingly, the thermal displacement can be accurately estimated even in the transient state where the operating state of the cooling device is changed, and thus the power consumption can be reduced without deteriorating the machining accuracy.

According to another aspect of the disclosure, the cooling capacity change of the cooling device is any one of or both of the operating and stopping of the cooling device and increasing and decreasing of the cooling oil amount used for cooling. Thus, in addition to the above-described effect, it is possible to perform the thermal displacement estimation that corresponds not only to the operating and stopping of the cooling device but also to the increasing and decreasing of the cooling oil amount.

According to another aspect of the disclosure, the conversion coefficient equivalent temperature change amount is calculated based on the rotation speed of the rotation shaft and time after the cooling capacity change. Thus, in addition to the above-described effect, it is possible to estimate the thermal displacement with high accuracy corresponding to the change of the cooling capacity in accordance with the rotation speed.

According to another aspect of the disclosure, the cooling heat amount equivalent temperature change amount is calculated based on the predetermined temperature time constant before the cooling capacity change of the cooling device, the predetermined temperature time constant after the cooling capacity change of the cooling device, and time after the cooling capacity change. Thus, in addition to the above-described effect, it becomes easy to set the cooling heat amount equivalent temperature change amount.

According to another aspect of the disclosure, as a condition of the cooling capacity change of the cooling device, the upper limit value and lower limit value of the temperature rise value are predetermined, and the cooling capacity is increased when it becomes equal to or more than the upper limit value. Thus, in addition to the above-described effect, it is possible to avoid a risk of abnormal heat generation such as bearing seizure caused by decreasing the cooling capacity. On the other hand, by decreasing the cooling capacity when the temperature rise value becomes equal to or less than the lower limit value, reduction of the power consumption can be facilitated.

According to another aspect of the disclosure, when the rotation shaft is used as the cooling target, the temperature rise value of the bearing portion of the rotation shaft or the proximity of the bearing portion based on the temperature of the main body structure is used. Thus, in addition to the above-described effect, it is possible to estimate the thermal displacement with high accuracy.

DETAILED DESCRIPTION OF THE INVENTION

The following describes embodiments of the disclosure based on the drawings.

Figure 1:
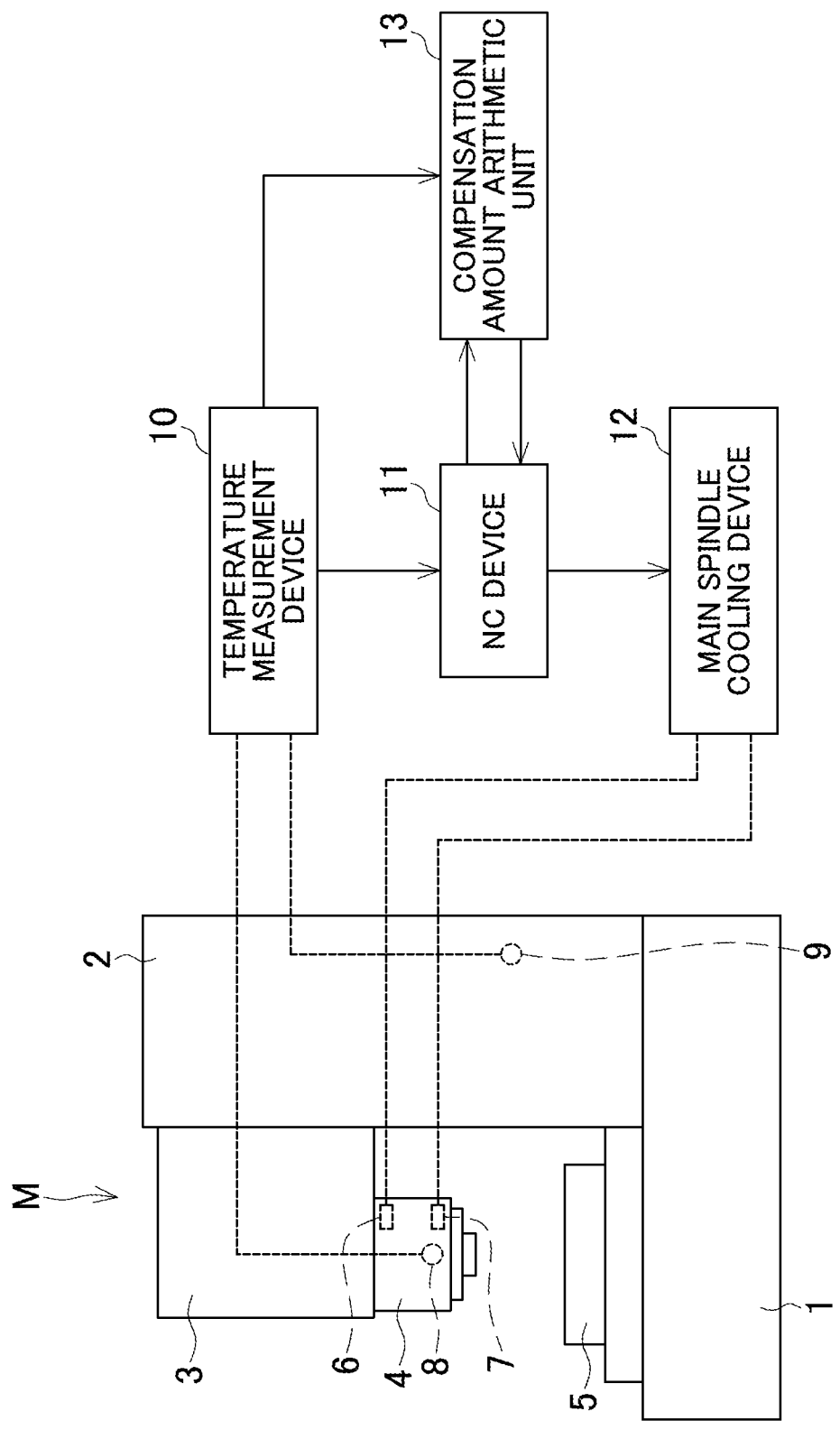
FIG. 1 is a block diagram illustrating a configuration of a machining center.

FIG. 1 indicates a block diagram illustrating a configuration of a machining center M that is one example of a machine tool having a second configuration.

The machining center M includes a bed 1, a column 2, a main spindle head 3, a main spindle unit 4, and a table 5. The machining center M includes a temperature measurement device 10, an NC device 11, a main spindle cooling device 12, and a compensation amount arithmetic unit 13. The NC device 11 includes a central processing unit (CPU) and a memory connected to the CPU and ensures the operations.

The temperature measurement device 10 detects a temperature rise of a bearing portion of the main spindle with a temperature sensor 8 disposed in the main spindle unit 4 and detects a machine body temperature serving as a reference temperature with a temperature sensor 9 disposed in the column 2.

The main spindle cooling device 12 has a cooling circuit that supplies a cooling oil to a cooling oil inlet 6 of a main spindle housing outer cylinder and returns the cooling oil from a cooling oil outlet 7.

The NC device 11 performs operation control of the main spindle cooling device 12, in addition to rotation control of the main spindle and movement control of the feed axis. The operation control is performed based on a predetermined upper limit value and a predetermined lower limit value of a temperature difference (hereinafter referred to as a "temperature rise value") between the temperature sensor 8 and the temperature sensor 9. Specifically, the operation of the main spindle cooling device 12 is stopped when the temperature rise value becomes equal to or less than the lower limit value, and the operation of the main spindle cooling device 12 is resumed when the temperature rise value becomes equal to or more than the upper limit value.

The temperatures detected with the respective temperature sensors 8, 9 are converted and quantified from analog signals into digital signals by a known method according to a predetermined cycle in the temperature measurement device 10 and transmitted to the compensation amount arithmetic unit 13. The respective temperature sensors 8, 9 and the temperature measurement device 10 are one example of a temperature detection unit of the disclosure.

In the compensation amount arithmetic unit 13, a main spindle thermal displacement is estimated based on an estimated main spindle temperature calculated from quantified temperature data and the estimation model including a predetermined thermal displacement estimation formula using a conversion coefficient from a main spindle temperature into the main spindle thermal displacement. A compensation amount based on the estimated thermal displacement is output to the NC device 11. The compensation amount arithmetic unit 13 is one example of a thermal displacement estimating unit of the disclosure.

The NC device 11 compensates a movement amount of each feed axis based on the compensation amount.

The following describes estimation of the main spindle thermal displacement in the compensation amount arithmetic unit 13.

First, by Formula 1, a temperature rise value $\theta_n$ is calculated with a temperature $\theta1_n$ measured with the temperature sensor 8 and a temperature $\theta2_n$ measured with the temperature sensor 9. A temperature $\theta_{Equn}$, which is a cooling heat amount equivalent temperature change amount, equivalent to a changed heat amount before and after a cooling capacity change of the main spindle cooling device 12 is indicated by Formula 2. A temperature $\theta_{Gn}$, which is a conversion coefficient equivalent temperature change amount, equivalent to a difference in conversion coefficient between a temperature and a displacement before and after a cooling capacity change of the main spindle cooling device 12 is indicated by Formulae 3-1 and 3-2. An estimated main spindle temperature $\theta_{ESTn}$ is calculated by Formula 5 based on a temperature $\theta_{CORn}$ obtained by adding the temperature $\theta_{Equn}$ and the temperature $\theta Gn$ to the calculated temperature rise value $\theta_n$ (Formula 4).

$$\theta_n = \theta1_n - \theta2_n \qquad \text{Formula 1}$$

$\theta1_n$: the nth temperature of a bearing portion of the main spindle detected by the temperature sensor 8

$\theta2_n$: nth machine body temperature detected by the temperature sensor 9

$\theta_n$: nth temperature rise value $$\theta_{Equn} = \beta1 \times \exp(\Delta t \times n/T1) - \beta2 \times \exp(\Delta t \times n/T2) \qquad \text{Formula 2}$$

$\Delta t$: time interval of estimation calculation processing $\beta1$: calculation coefficient 1 of $\theta_{Equ}$ $\beta2$: calculation coefficient 2 of $\theta_{Equ}$ T1: temperature time constant related to a cooling heat amount before the cooling capacity change T2: temperature time constant related to the cooling heat amount after the cooling capacity change $\theta_{Equn}$: nth cooling heat amount equivalent temperature change amount $$G_n = G_{n-1} + (G0 - G_{n-1}) \times [\Delta t/(\Delta t + T3)] \qquad \text{Formula 3-1}$$

$$\theta_{Gn} = (\theta_n + \theta_{Equn}) \times G_n \qquad \text{Formula 3-2}$$

Gn: the nth calculation coefficient of $\theta_G$

G0: convergence value of the calculation coefficient of $\theta_G$ $\Delta t$: time interval of the estimation calculation processing T3: time constant related to the conversion coefficient between the temperature and the displacement after the cooling capacity change $\theta_{Gn}$: nth conversion coefficient equivalent temperature change amount $$\theta = \theta_n + 0_{Equn} + \theta_{Gn} \qquad \text{Formula 4}$$

$\theta_{CORn}$: temperature in which the temperature equivalent to the changed heat amount before and after the cooling capacity change and the temperature equivalent to the difference in the conversion coefficient between the temperature and the displacement before and after the cooling capacity change are added to the nth temperature rise value $$\theta_{ESTn} = \theta_{ESTn-1} + (\theta_{CORn} - \theta_{ESTn-1}) \times [\Delta t/(\Delta t + \alpha)] \qquad \text{Formula 5}$$

$\Delta t$: time interval of the estimation calculation processing $\alpha$: time response coefficient $\theta_{ESTn}$: nth estimated main spindle temperature Next, by Formula 6, a main spindle thermal displacement $Z_n$ is estimated with the estimated main spindle temperature $\theta_{ESTn}$ and a temperature-displacement conversion coefficient $\gamma$. The coefficient $\gamma$ is a predetermined temperature-displacement conversion coefficient in the operating state of the main spindle cooling device 12.

$$Z_n = \theta_{ESTn} \times \gamma \qquad \text{Formula 6}$$

Figure 2:
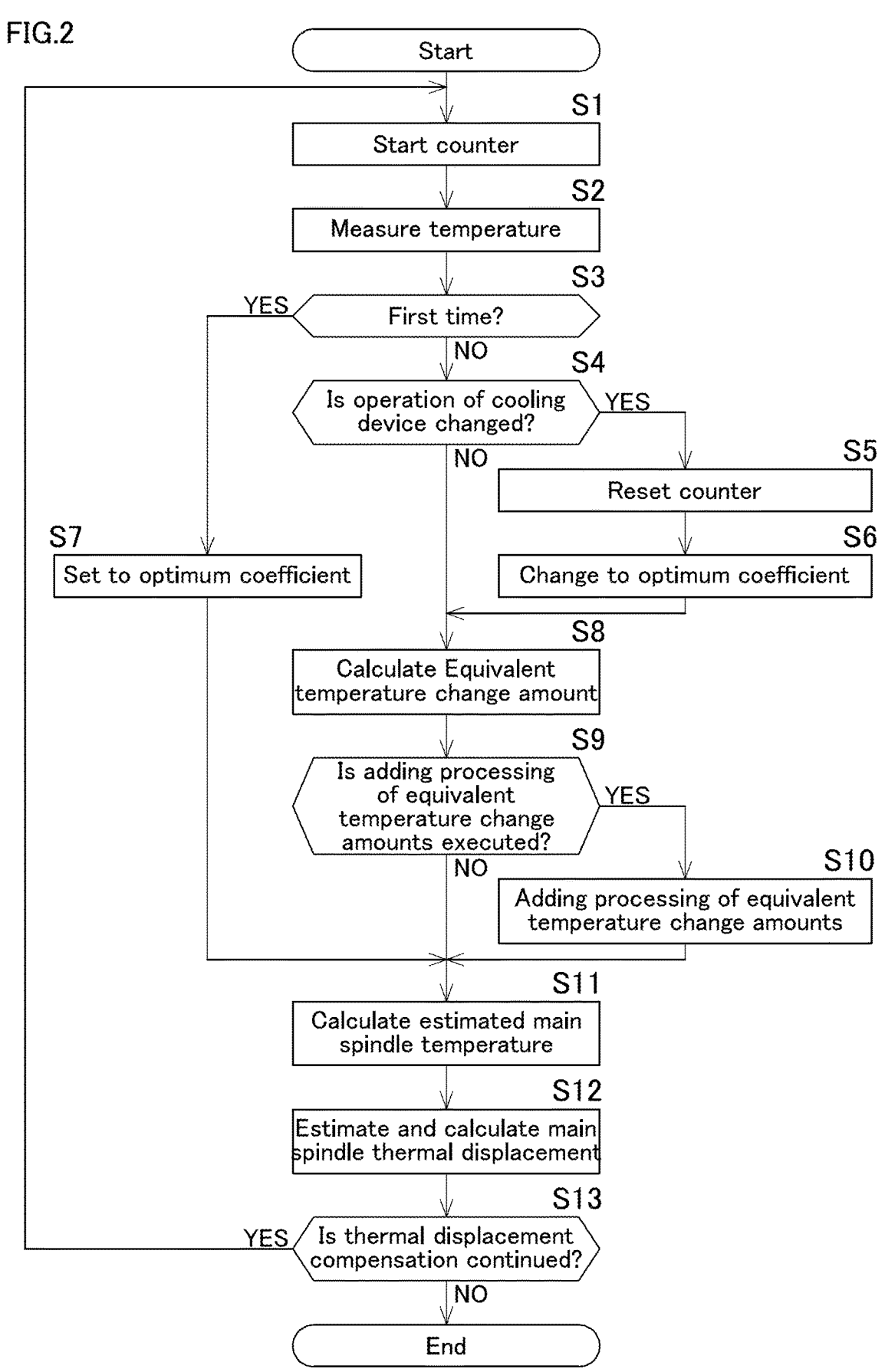
FIG. 2 is a flowchart of a thermal displacement estimating method.

$\gamma$: temperature-displacement conversion coefficient $Z_n$: nth main spindle thermal displacement The following describes a thermal displacement estimating method according to a first configuration when the operation control of the main spindle cooling device 12 is performed at an optional main spindle rotation speed based on the flowchart in FIG. 2.

The estimation calculation processing is performed at the time interval $\Delta t$, and at S1, a counter of the number of processings starts.

At S2, a bearing portion temperature is measured and quantified with the temperature sensor 8, a machine temperature is measured and quantified with the temperature sensor 9, then current temperature data is obtained to calculate the temperature rise value $\theta_n$ by Formula 1.

At S3, it is determined whether or not thermal displacement compensation processing is being performed for the first time. Here, when it is the first time, the process proceeds to S7, and when it is second time or later, the process proceeds to S4.

At S4, it is determined whether or not a timing condition of an operation control change of the main spindle cooling device 12 is satisfied. The timing condition here is whether or not any of the predetermined upper limit value or lower limit value of the temperature rise value has been reached. When the temperature rise value becomes equal to or less than the lower limit value, the operation of the main spindle cooling device 12 is stopped, and when the temperature rise value becomes equal to or more than the upper limit value, the operation of the main spindle cooling device 12 is resumed. The upper limit value and the lower limit value are set, for example, as follows. The temperature rise value when the main spindle cooling device 12 is in operation and is operated at the maximum rotation speed is set as the upper limit value. The temperature rise value when the main spindle cooling device 12 is in operation and is operated at a rotation speed that is a half of the maximum rotation speed is set as the lower limit value.

When the operation of the main spindle cooling device 12 is changed by satisfying the timing condition at S4, the count number is reset, and the counter starts again at S5.

At S6 and S7, in accordance with the operating state or the stopped state of the main spindle cooling device 12, the coefficients $\beta 1$, $\beta 2$, T1, T2, G0, T3, and $\alpha$, which are used in Formulae 2, 3, 5, are changed or set to predetermined optimum coefficients. The coefficients may be fixed values, may be different depending on the operating state or the stopped state, or may be a function of temperature in accordance with the operating state or the stopped state.

The convergence value G0 of the calculation coefficient of $\theta_G$ can also be a function of a main spindle rotation speed. In this case, the thermal displacement can be estimated with high accuracy corresponding to changes in the cooling capacity in accordance with the rotation speed.

At S8, the cooling heat amount equivalent temperature change amount $\theta_{Equn}$ is calculated from Formula 2, and the conversion coefficient equivalent temperature change amount $\theta_{Gn}$ is calculated from Formulae 3-1 and 3-2, respectively.

At S9, it is determined whether or not addition of the cooling heat amount equivalent temperature change amount $\theta_{Equn}$ and the conversion coefficient equivalent temperature change amount $\theta_{Gn}$ is executed. The determination condition is, for example, a magnitude relationship between the equivalent temperature change amounts to be added and the predetermined threshold value or a magnitude relationship between the count number and the threshold value. In the former case, the process proceeds to S10 when the equivalent temperature change amounts to be added are equal to or more than the threshold values, and the process proceeds to S11 when they are smaller than the threshold values. In the latter case, the process proceeds to S10 when the count number is equal to or less than the threshold value, and the process proceeds to S11 when it is larger than the threshold value.

At S10, by Formula 4, the cooling heat amount equivalent temperature change amount $\theta_{Equn}$ and the conversion coefficient equivalent temperature change amount $\theta_{Gn}$ calculated at S8 are added to the temperature rise value $\theta_n$ calculated at S2.

At S11, the estimated main spindle temperature $\theta_{ESTn}$ is calculated by Formula 5.

At S12, based on the estimated main spindle temperature $\theta_{ESTn}$ calculated at S11, the main spindle thermal displacement $Z_n$ is estimated by Formula 6 and the compensation amount is calculated.

At S13, it is determined whether or not a thermal displacement compensation is continued. When it is determined to continue, the process is returned to S2 and is executed from thermometer measurement.

Thus, the thermal displacement estimating method of the above-described embodiment executes a temperature detecting step S2 and a thermal displacement estimating step (S3 to S12) in the machining center M including the main spindle cooling device 12, which is one example of the cooling device, and the temperature measurement device 10. At the temperature detecting step S2, the temperatures of the bearing portion of the main spindle, which is one example of the predetermined heat generating portion, and the column 2, which is one example of the predetermined main body structure, are each detected by the temperature measurement device 10. At the thermal displacement estimating step (S3 to S12), the thermal displacement of the main spindle is estimated by the estimation model constituted of Formulae 1 to 6, based on the detected temperatures.

Then, at the thermal displacement estimating step, the following is performed. The coefficients for estimating the thermal displacement from the detected temperatures are determined according to the cooling capacity change by the operation control of the main spindle cooling device 12 when the machine is in operation (S6, S7). The cooling heat amount equivalent temperature change amount equivalent to a changed heat amount before and after the cooling capacity change is obtained from a relationship between the predetermined cooling heat amount of the main spindle cooling device 12 and the temperature equivalent to the cooling heat amount (S8). The conversion coefficient equivalent temperature change amount equivalent to the change amount of the conversion coefficient before and after the cooling capacity change is obtained from a relationship between the cooling heat amount of the cooling device 12 and the conversion coefficient between the temperature for estimating the thermal displacement from the detected temperature and the displacements (S8). Then, the thermal displacement of the main spindle is estimated based on the temperature where the equivalent temperature change amount is added to the detected temperature and the coefficients (S12).

According to the configuration, it is possible to deal with deterioration of thermal displacement estimation accuracy caused in a cooling transient state when the operation control of the main spindle cooling device 12 is performed when the machine is in operation. Accordingly, the thermal displacement can be accurately estimated even in a transient state when the operating state of the main spindle cooling device 12 is changed, and thus power consumption can be reduced without deteriorating machining accuracy.

In particular, the cooling capacity change of the main spindle cooling device 12 is any one of or both of the operating and stopping of the main spindle cooling device 12 and increasing and decreasing of the cooling oil amount used for cooling.

Accordingly, it is possible to perform the thermal displacement estimation corresponding not only to the operating and stopping of the main spindle cooling device 12 but also to the increasing and decreasing of the cooling oil amount.

The cooling heat amount equivalent temperature change amount is calculated based on the temperature time constant before the cooling capacity change, the temperature time constant after the cooling capacity change, and the time after the cooling capacity change.

Accordingly, it becomes easy to set the cooling heat amount equivalent temperature change amount.

The condition of the cooling capacity change of the main spindle cooling device 12 is as follows. That is, with the predetermined upper limit value and the predetermined lower limit value as threshold values, the cooling capacity is decreased when the temperature rise value of the detected temperature becomes equal to or less than the lower limit value, and the cooling capacity is increased when it becomes equal to or more than the upper limit value.

Accordingly, it is possible to avoid a risk of abnormal heat generation such as bearing seizure caused by decreasing the cooling capacity. On the other hand, by decreasing the cooling capacity when the temperature rise value becomes equal to or less than the lower limit value, reduction of the power consumption can be facilitated.

The heat generating portion is the main spindle, which is one example of the rotation shaft, and the temperature rise value in a proximity of the bearing portion of the main spindle based on the temperature of the column 2 is used for the thermal displacement estimation.

Accordingly, the thermal displacement can be estimated with high accuracy.

In the above-described embodiment, the case where both the cooling heat amount equivalent temperature change amount and the conversion coefficient equivalent temperature change amount are used has been described. However, for the main spindle with the small thermal displacement, it is expected that the estimation accuracy of the thermal displacement will be improved by using any one of the cooling heat amount equivalent temperature change amount or the conversion coefficient equivalent temperature change amount. Thus, only one of them may be used.

In the above-described embodiment, at S9, it is determined whether or not adding of the equivalent temperature change amount to the measured temperature data is executed based on the determination condition. However, the determination may be eliminated, and the equivalent temperature change amount may be always added.

In the above-described embodiment, the change of the coefficients at S6 is executed in accordance with the operating state and the stopped state of the main spindle cooling device. However, the coefficients may be changed not only in a timing at which the main spindle cooling device is turned ON or OFF, but also, for example, in a timing at which the cooling oil amount is changed or the cooling capacity is changed (for example, a state where only a refrigeration machine is stopped, and a pump is operated) even when the main spindle cooling device is in a ON state.

The rotation shaft for estimating the thermal displacement is not limited to the main spindle. The temperature other than the bearing portion may be detected. A plurality of temperature sensors may be disposed in each of the heat generating portion and the main body structure portion, and, for example, the average of the measured values may be used.

The cooling device of the disclosure is not limited to one that targets the main spindle. The machine tool targeted by of the disclosure also is not limited to a machining center.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A thermal displacement estimating method for a machine tool including a cooling device and a temperature measurement device, comprising detecting each temperature of a predetermined heat generating portion and a predetermined main body structure portion by the temperature measurement device; and estimating a thermal displacement of the heat generating portion by an estimation model based on a detected temperature, wherein the estimating of the thermal displacement includes:

determining a coefficient related to a time response for estimating the thermal displacement from the detected temperature in accordance with a cooling capacity change due to operation control of the cooling device when the machine is in operation;

obtaining a conversion coefficient equivalent temperature change amount equivalent to a change amount of a conversion coefficient before and after the cooling capacity change from a relationship between a predetermined cooling heat amount of the cooling device and the conversion coefficient between the temperature and the displacement for estimating the thermal displacement from the detected temperature and/or a cooling heat amount equivalent temperature change amount equivalent to a changed heat amount before and after the cooling capacity change from a relationship between the predetermined cooling heat amount and a temperature equivalent to the cooling heat amount; and estimating the thermal displacement of the heat generating portion based on the coefficient and a temperature obtained by adding the conversion coefficient equivalent temperature change amount and/or the cooling heat amount equivalent temperature change amount to the detected temperature.

2. The thermal displacement estimating method for the machine tool according to claim 1, wherein the cooling capacity change of the cooling device is any one of or both of operating and stopping of the cooling device and increasing and decreasing of the cooling oil amount used for cooling.

3. The thermal displacement estimating method for the machine tool according to claim 1, wherein the heat generating portion is a rotation shaft, and the conversion coefficient equivalent temperature change amount is calculated based on a rotation speed of the rotation shaft and a time after the cooling capacity change of the cooling device.

4. The thermal displacement estimating method for the machine tool according to claim 1, wherein the cooling heat amount equivalent temperature change amount is calculated based on a temperature time constant before the cooling capacity change, a temperature time constant after the cooling capacity change, and a time after the cooling capacity change.

5. The thermal displacement estimating method for the machine tool according to claim 1, wherein a condition of the cooling capacity change of the cooling device has a predetermined upper limit value and a predetermined lower limit value as threshold values, the cooling capacity is decreased when a temperature rise value of the detected temperature becomes equal to or less than the lower limit value, and the cooling capacity is increased when the temperature rise value of the detected temperature becomes equal to or more than the upper limit value.

6. The thermal displacement estimating method for the machine tool according to claim 5, wherein the heat generating portion is a rotation shaft, and a temperature rise value of a bearing portion of the rotation shaft or a proximity of the bearing portion based on a temperature of the main body structure portion is used for thermal displacement estimation.

7. A machine tool comprising:

a cooling device;

a temperature measurement device;

a temperature detection unit that detects each temperature of a predetermined heat generating portion and a predetermined main body structure portion by the temperature measurement device; and a thermal displacement estimating unit that estimates a thermal displacement of the heat generating portion by an estimation model based on a detected temperature, wherein the thermal displacement estimating unit is configured to:

determine a coefficient related to a time response for estimating the thermal displacement from the detected temperature in accordance with a cooling capacity change due to operation control of the cooling device when the machine is in operation;

obtain a conversion coefficient equivalent temperature change amount equivalent to a change amount of a conversion coefficient before and after the cooling capacity change from a relationship between a predetermined cooling heat amount of the cooling device and the conversion coefficient between the temperature and the displacement for estimating the thermal displacement from the detected temperature and/or a cooling heat amount equivalent temperature change amount equivalent to a changed heat amount before and after the cooling capacity change from a relationship between the predetermined cooling heat amount and a temperature equivalent to the cooling heat amount; and estimate the thermal displacement of the heat generating portion based on the coefficient and a temperature obtained by adding the conversion coefficient equivalent temperature change amount and/or the cooling heat amount equivalent temperature change amount to the detected temperature.

* * * * *